United States Patent [19]
Eschbach et al.

[11] Patent Number: 4,834,639
[45] Date of Patent: May 30, 1989

[54] APPARATUS FOR MAKING A THERMOPLASTIC PRODUCT FROM A BASE PLASTIC MATERIAL AND AT LEAST ONE MARBLING ADDITIVE MATERIAL

[75] Inventors: Mathias Eschbach, Haltern; Wolf-Dieter Schliehe, Dorsten, both of Fed. Rep. of Germany

[73] Assignee: W. Dollken & Co. GmbH, Essen, Fed. Rep. of Germany

[21] Appl. No.: 144,875

[22] Filed: Jan. 13, 1988

[30] Foreign Application Priority Data

Jan. 13, 1987 [DE] Fed. Rep. of Germany ....... 3700724

[51] Int. Cl.$^4$ .......................................... B29C 47/04
[52] U.S. Cl. .................................. 425/131.1; 264/75; 264/171; 264/211.21; 264/245; 264/349; 425/207; 425/208; 425/381; 425/382.3
[58] Field of Search ...................... 264/75, 211.21, 349, 264/328.18, 245, 171, 211.23; 425/131.1, 205–209, 382.3, 381, 146

[56] References Cited

U.S. PATENT DOCUMENTS 3,664,789  5/1972  Gibney ............................... 425/381
4,183,673  1/1980  Easley et al. .................... 264/328.18
4,289,408  9/1981  Langlois ......................... 264/328.18
4,548,776 10/1985  Holdredge, Jr. ..................... 425/209
4,749,279  6/1988  Csongor ............................. 425/209

FOREIGN PATENT DOCUMENTS 8530358  11/1986  Fed. Rep. of Germany .
3538116A   4/1987  Fed. Rep. of Germany ........ 264/75
1229578    9/1960  France ............................... 264/349
51-46130  12/1976  Japan ..................................... 264/75

Primary Examiner—Jeffery Thurlow
Attorney, Agent, or Firm—Herbert Dubno

[57] ABSTRACT

In the extrusion process an inhomogeneous thermoplastic marbled product is made from a base plastic material and at least one marbling additive material mixed therein. The additive material is fed into the interior of an extrudate flow made from the base plastic material in an extruder device. The extruder has a mixing head at the end of its screw having a narrow throat surrounded by a ring. The ring is formed with angularly spaced slot-like passages for the base material. The additive veining plastic is fed through the mixing head downstream of this throat.

4 Claims, 2 Drawing Sheets

APPARATUS FOR MAKING A THERMOPLASTIC PRODUCT FROM A BASE PLASTIC MATERIAL AND AT LEAST ONE MARBLING ADDITIVE MATERIAL

FIELD OF THE INVENTION

Our present invention relates to a process and apparatus or extruder for making a thermoplastic product from a base plastic (synthetic resin) material and at least one marbling or veining additive material, namely another veining or marbling synthetic resin.

BACKGROUND OF THE INVENTION

An extruder head for extrusion of a thermoplastic product made from a base plastic material and at least one marbling additive material is connectable to a plastic extrusion screw press having a cylindrical housing and a screw shaft.

This extruder has a mixer connected to the screw shaft and a mixer housing connected to the cylindrical housing. The mixer housing has a device for feeding the additive material and the mixer has a connector piece whose diameter corresponds to that of a core of the screw shaft associated therewith.

By "marbling" or "veining" we mean the formation of an intermixture of two or more thermoplastic materials such that the extruded product has a marbled structure, i.e. visible veins of the additive within the base material and hence an appearance that is inhomogeneous to the eye in cross section and along the periphery—usually through and through. Such extruded products are used for a variety of purposes, for example as bars, legs, arms, sections or strips in the furniture industry in situations where the section or strip should have a woodlike grain when originally visible or after shaping or working in connection with an article of furniture.

An extruder for making a thermoplastic product from a base plastic material and at least one additive marbling material is described in German Utility Model DE-GM 85 30 358. In the known process however the additive material is brought into an extruded stream made of the base plastic material from the outside of the extruded stream in the extruder.

This leads to laminations which depart seriously from the marbling. To ensure a marbling effect an additional agitation or turbulence must be introduced; this frequently is unsatisfactory. In the known extruder the mixer comprises a plate which is inserted diametrically and axially parallel in a connector piece for the mixer.

OBJECTS OF THE INVENTION

It is an object of our invention to provide an improved process and apparatus for making a thermoplastic extruded product from a base plastic material and at least one marbling additive material which avoids the above mentioned disadvantages.

It is also an object of our invention to provide an improved process for making a thermoplastic product from a base plastic material and at least one marbling additive material in which a completely distributed interior marbling is attainable which, as required, may have a surrounding coating made of the base plastic material. The marbling can then be produced by a woodworking technique in which the surrounding coating is removed exposing the woodgrain like surface. On the other hand the envelope surrounding the extruded product can be impressed with a woodlike grain or that envelope can be glued on with a corresponding adhesive foil.

SUMMARY OF THE INVENTION

These objects and others which will become more readily apparent hereinafter are attained in accordance with our invention in a process for extrusion of a thermoplastic product made from a base plastic material and at least one marbling additive material mixed therein. The objects are also attained in an extruder connectable to a plastic extrusion screw press having a cylindrical housing and a screw shaft for extrusion of the thermoplastic product made from a base plastic material and at least one marbling additive material mixed in.

The extruder has a mixer connected to the screw shaft and a mixer housing connected to the cylindrical housing. The mixer housing has a device for feeding the additive material and the mixer has a connector piece whose diameter corresponds to that of a core of the screw shaft associated therewith.

According to our invention the additive material is fed into the interior of an extruded stream made of the base plastic material in the extruder.

This can be accomplished in various ways. For example we can provide a passage which runs through the entire screw shaft to the apex of the screw shaft and/or in a mixing head connected to it. Suitable openings or mouths are of course connected with this passage.

An extruder which is particularly suitable for the process of our invention does not have the above described passage in the screw shaft. Instead this extruder has a throat piece connected to the connector piece of the mixer. The diameter of the throat piece is reduced in a reduced portion relative to that of the connector piece. The throat piece carries a mixing head having a throat connecting cone and a cone peak.

The diameter of the mixing head corresponds to the diameter of the connector piece up to the cone peak and the mixing head has a plurality of melt ducts opening in the cone peak extending from the throat connecting cone parallel to the mixer axis of the mixer.

The mixer housing is provided with a ring member which extends to a lateral passage for the melt in the throat piece provided with the reduced portion and the throat connecting cone.

The ring member is connected with the mixer housing surrounding the ring member by a plurality of cross pieces forming melt passages for the melt and the surrounding mixer housing having a circumferential feed space for the additive material which is provided with a plurality of radial feed ducts through the cross pieces which end in the vicinity of the throat piece.

Advantageously the throat piece has a diameter which is equal to or less than half the diameter of the connector piece. The melt ducts can be slotlike and of course can be curved or arced in a cross section perpendicular to the axis of the screw shaft and/or of the extruder. Also the melt passages can have curved or arched cross sections. Within the framework of our invention additional mixer pins can be provided in the mixing head which project into the surrounding melt.

The advantages of our invention include a very complete permeation of marbling throughout the bulk of the extruded product and, of course, the formation of an outer surrounding coating of the marbled extruded product by the base plastic material.

To attain this result there need only be provided a gap between the mixing head and the mixer housing in the vicinity of the cone apex.

BRIEF DESCRIPTION OF THE DRAWING

The above and other objects, feature and advantages of our invention will become more readily apparent from the following description, reference being made to the accompanying highly diagrammatic drawing in which.

SPECIFIC DESCRIPTION

Figure 1:
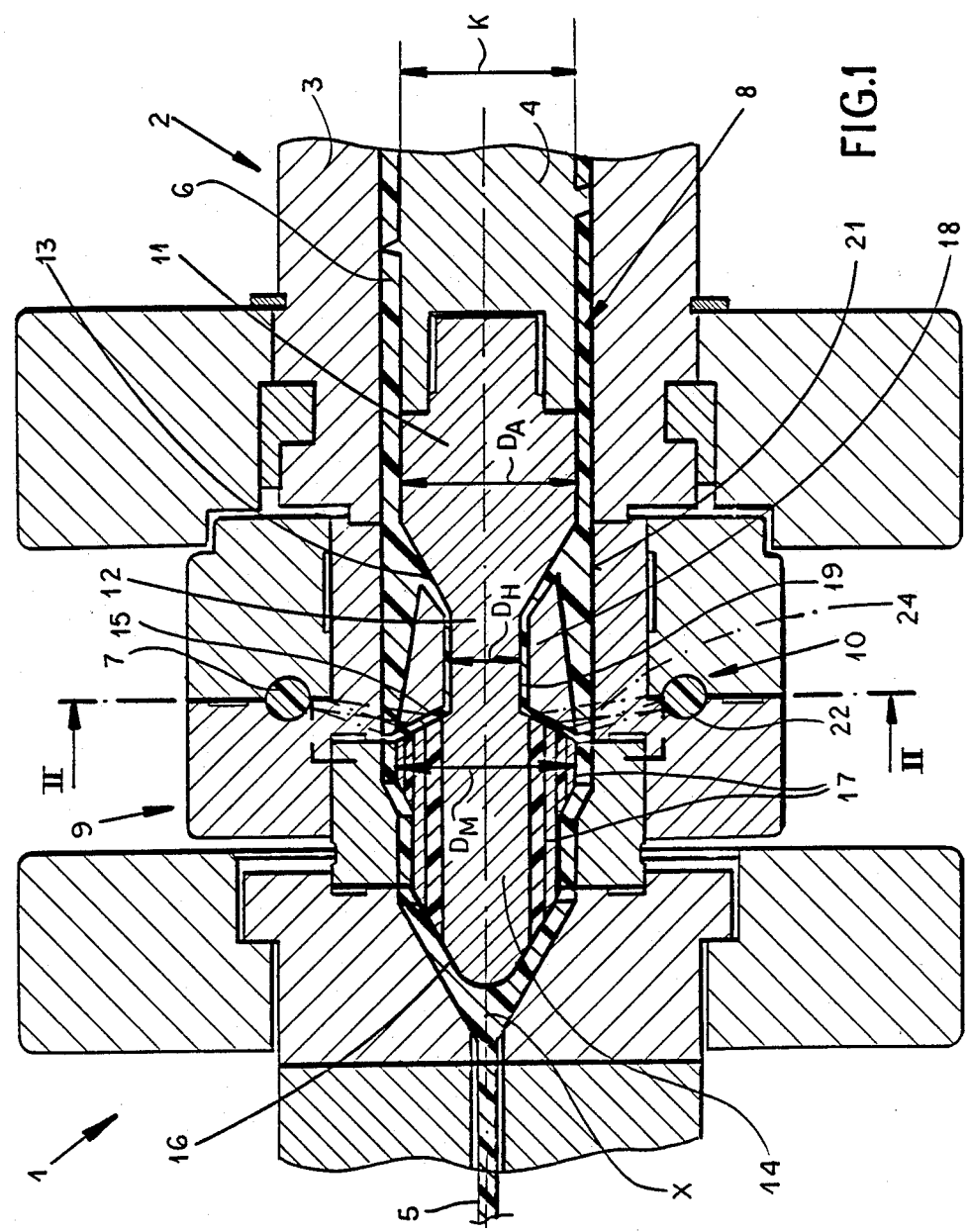
FIG. 1 is a longitudinal cross sectional view through an extruder according to our invention.

The extruder 1 shown in the drawing is connectable to a plastic extrusion screw press 2 of which the cylindrical housing 3 and the screw shaft 4 are visible on the right in the drawing.

The extruder 1 extrudes a thermoplastic product made from a base plastic material and at least one marbling additive material mixed in with it.

A mixer 8 is connected to the screw shaft 4 and the mixer housing 9 embraces or surrounds the cylindrical housing 3. The mixer housing 9 has a device 10 for feeding in the additive material 7.

This device 10 is connected to an additional extrusion screw press for processing the additive material.

The mixer 8 has a connector piece 11 whose diameter $D_A$ corresponds to that of the core K of the associated screw shaft 4.

Figure 2:
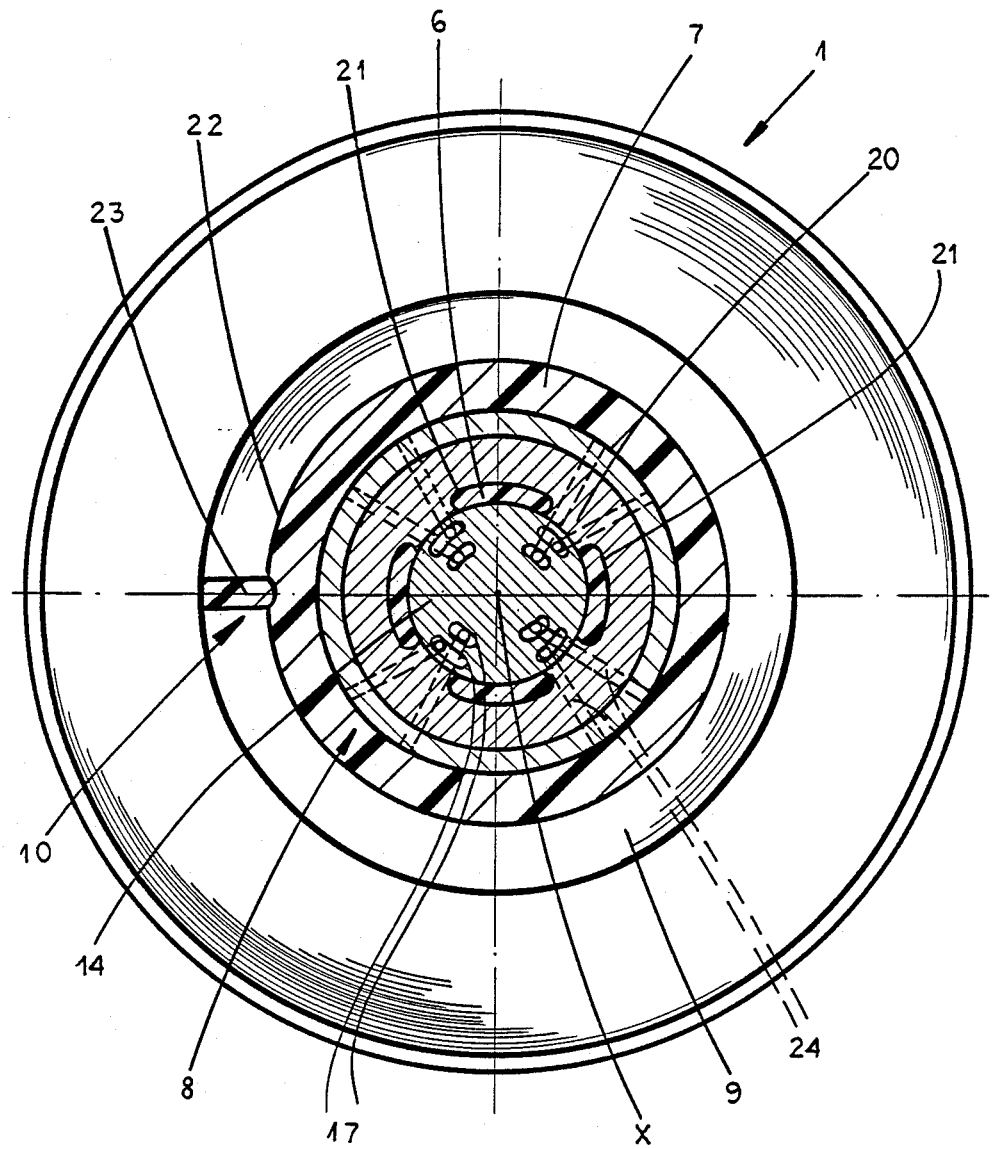
FIG. 2 is a cross sectional view through the apparatus of FIG. 1 taken along the line II—II.

From FIGS. 1 and 2 it can be seen that a throat piece 12 is connected to the connector piece 11 of the mixer 8. Its diameter $D_H$ is reduced in a reduced portion 13 relative to that of the connector piece 11.

The throat piece 12 carries a mixing head 14 with a throat connecting cone 15 and a cone apex 16. The diameter $D_M$ of the mixing head 14 corresponds to the diameter $D_A$ of the connector piece 11 up to the cone apex 16 and thus to the diameter K of the core of the screw shaft 4.

The mixing head 14 has melt ducts 17 opening in the cone apex 16 extending from the throat connecting cone 15 parallel to the mixer axis X. The mixer housing 9 is provided with a ring member 18 which defines a lateral passage 19 for the melt in the throat piece 12 having the reduced portion 13 and the throat connecting cone 15.

The ring member 18 which also forms melt passages 21 for the melt is connected with the surrounding mixer housing 9 by cross pieces 20. The surrounding mixer housing 9 has an enclosed feed space 22 for the additive material.

The supply of the additive material 7 to the feed space 22 is effected through an additive duct 23. Additive feed ducts 24 which end in the vicinity of the throat piece 12 of the mixer 8 guided through the cross pieces 20 extend radially from the feed space 22.

The throat piece 12 can have a diameter $D_H$ which is is equal to half the diameter $D_A$ of the connector piece 11 and is even somewhat smaller. The melt ducts 17 are slotlike as is indicated particularly in FIG. 2 and are curved or rounded in cross section. That is also true for the melt passages 21.

In operation, as the extruded strand of the base thermoplastic 6 is forced through the mixing head 9, at various locations around and outwardly of the axis, streamlets of the additive thermoplastic 7 are supplied to form internal veining surrounded by a continuous layer of the base thermoplastic 6. When the bars, rods or profiles are then shaped by standard woodworking methods, the veining is brought out.

We claim:

1. An apparatus for making a thermoplastic extruded product from a base plastic material and at least one marbling additive material, comprising:
   a plastic extrusion screw press, said press including:
      a screw shaft having a core; and
      a cylindrical housing surrounding said shaft;
   an extruder head downstream from said press;
   a mixer positioned between said screw press and said extruder head, said mixer having an axis along a direction of feed of said thermoplastic extruded product, said mixer including:
      a mixer housing surrounding said mixer and connected to said cylindrical housing;
      a device located within said mixer housing for feeding said additive material;
      a connector piece adjacent said screw shaft having a diameter corresponding to a diameter of said core of said shaft;
      a throat piece connected downstream to said connector piece, said throat piece having a reduced portion whose diameter is less than the diameter of said connector piece;
      a mixing head connected downstream to said throat piece and including;
         a throat connecting cone adjacent said throat piece;
         a cone apex at an end of said mixing head distant from said throat piece, said mixing head, except for said cone apex, having a diameter corresponding to the diameter of said connector piece; and
         a plurality of melt ducts opening into said cone apex extending from said throat connecting cone parallel to said mixer axis;
      a lateral passage for a melt of said base plastic material formed along said reduced portion of said throat piece and said throat connecting cone;
      a non-rotating ring member interior to said mixer housing, said ring member extending to said lateral passage;
      a plurality of cross pieces connecting said ring member to said mixer housing;
      a circumferential feed space, for delivering the additive material, positioned within said mixer housing; and
      a plurality of radial feed ducts traversing said cross pieces and ending in a vicinity of said throat piece.

2. The improvement defined in claim 1 wherein said diameter of said throat piece is less than or equal to one half said diameter of said connector piece.

3. The improvement defined in claim 1 wherein said melt ducts are slotlike and each have a curved cross section.

4. The improvement defined in claim 1 wherein said melt passages each have an arched cross section.

* * * * *